United States Patent [19]
Amabile et al.

[11] Patent Number: 5,488,221
[45] Date of Patent: Jan. 30, 1996

[54] SLOT INTERLOCK CONNECTORS FOR RF WELDING ELECTRODES

[76] Inventors: Louis Amabile; Andrew L. Amabile, both of 582 Grand Ave., Lindenhurst, N.Y. 11757

[21] Appl. No.: 374,115

[22] Filed: Jan. 18, 1995

[51] Int. Cl.⁶ ..................................... H05B 6/54
[52] U.S. Cl. ................ 219/765; 219/780; 156/380.2; 156/380.6; 29/592.1
[58] Field of Search .................... 219/765, 767, 219/768, 769, 777, 780; 156/274.4, 274.6, 274.8, 379.6–380.8; 29/592.1, 825

[56] References Cited

U.S. PATENT DOCUMENTS

| | | | |
|---|---|---|---|
| 3,360,417 | 12/1967 | Peterson et al. | 156/380.5 |
| 3,401,248 | 9/1968 | Kim | 219/767 |
| 3,993,529 | 11/1976 | Farkas | 156/380.7 |
| 4,268,338 | 5/1981 | Peterson | 156/274.4 |
| 5,223,684 | 6/1993 | Li et al. | 219/765 |

*Primary Examiner*—Philip H. Leung
*Attorney, Agent, or Firm*—Galgano & Burke

[57] ABSTRACT

Slot interlock connectors for RF welding electrodes include an electrode having a working edge, at least two ends and an integral mounting block which has ends which overshadow the ends of the electrode and provide substantially flat alignment surfaces adjacent to the ends of the electrode. The electrode may have a curved or straight working edge and the integral mounting block may be disposed on the interior concave surface of the electrode or the exterior convex surface of the electrode. According to the invention, the electrode can have one, two, three, four, or more working edges with one, two, three, four, or more integral mounting blocks. The ends of the mounting blocks overshadow the ends of the electrodes and provide substantially flat alignment surfaces or alignment channels adjacent to the ends of the electrode. Several embodiments of connectors are disclosed, including connectors having L, T, +, and * configurations. Preferred aspects of the invention include machining the electrode connectors from bronze, brass, aluminum, or copper, providing the working edge of the electrode with tearseal or other type of profile, and providing the integral mounting blocks with pre-drilled mounting holes.

19 Claims, 6 Drawing Sheets

SLOT INTERLOCK CONNECTORS FOR RF WELDING ELECTRODES

BACKGROUND OF THE INVENTION

1. Field of the Invention

The invention relates to high frequency welding of synthetic materials such as vinyl, polyester, nylon, PVC, plastic films, and the like. More particularly, the invention relates to connectors for coupling electrodes used in high frequency welding.

2. State of the Art

It has been well known in the art for many years to use high frequency electrodes to weld plastic sheet material. The underlying theory in this type of welding is known as dielectric or radio frequency heating. Almost any material will heat if an electric current of sufficient intensity is passed through it. The amount of heating is related to the conductivity of the material, the force (voltage) of the current passing through the material, and the frequency of the current. In the case of very poor conductors, such as most plastics, the amount of force required to heat these materials with a 60 Hz current is on the order of millions of volts. However, it is known that as the frequency of the current increases, the conductivity of the material being subjected to the current increases also. This is because the rapid change in the polarity of the current causes the molecules in the material to rapidly change their orientation thereby generating heat inside the material. Since materials which are poor electrical conductors are generally poor thermal conductors as well, radio frequency heating is the preferred method for sealing and welding these materials.

Typical applications of RF welding involve the welding of two plastic sheets. Prior art FIG. 1 shows an example of a simple sealing bar (rule) electrode 10 sealing two sheets of PVC film 12, 14. The two sheets of film 12, 14 are placed on top of each other and on top of a bedplate electrode 16. An optional heat insulating buffer material 18 is placed between the bedplate electrode 16 and the lower sheet 14. The buffer material 18 increases the effectiveness of the sealing apparatus by reducing heat sink losses through the bedplate electrode 16. The electrodes 10 and 16 are typically made of brass because brass is a good conductor, is durable, and is easily machined. In some applications, electrodes are made of beryllium copper (for extended runs) or aluminum and steel (for short runs). The buffer material 18 is typically a sheet of 0.015 XXP or XXXP grade, paper base, natural color, phenolic material because it is a sufficient thermal insulator, does not interfere with the electrical field passing through it, and is not heated directly by the field. After the sheets 12, 14 and the buffer material 18 are arranged on the bedplate electrode 16, the electrode 10 is pressed against the upper sheet 12 under the action of an air press (not shown) and RF current is caused to flow between the electrodes 10 and 16. The portions of the sheets 12, 14 which are located between the electrodes 10, 16 are caused to heat from the inside out whereupon they melt into each other and form a seal 20 which has substantially the same size and shape as the surface of the electrode 10.

In many cases, it is the outer edges of two sheets of plastic which are to be welded. This is the case, for example, in the manufacture of vinyl covered notebooks and the like. Moreover, it is also often desirable to provide a decorative bead effect at the outer edge of the welded sheets. Prior art FIG. 2 shows a "tearseal" electrode 11 which has an outer sharp edge 11a, an inner sealing surface 11b, and an intermediate bead well 11c. The outer sharp edge 11a typically extends beyond the inner sealing surface 11b by an amount approximately equal to one half the combined thickness of the sheets and the inner sealing surface 11b typically extends beyond the intermediate bead well 11c by a similar amount. The electrode 11 may be made from a laminate of three pieces of brass or may be machined from a single piece of brass. The operation of the sealing apparatus shown in FIG. 2 is substantially the same as the one in FIG. 1. However, as the sheets are welded, the outer sharp edge 11a substantially cuts the outer edges of the sheets and after the sheets are welded, the excess material is neatly removed by tearing it away.

In many applications, it is necessary or desirable to weld two sheets of plastic along two or more edges simultaneously, usually along four edges. FIG. 3 shows one known method of configuring electrodes to make a rectangular edge weld. Four brass rule electrodes 13, 15, 17, 19 are mounted on a backing plate 21. The backing plate 21 is typically a cast aluminum tool and jig plate. Cast aluminum is preferred because it is light weight, has a flat surface, and it cuts and taps easily. The electrodes are mounted to the backing plate 21 using aluminum mounting blocks 23, 25, 27, 29, 31, 33, 35, 37. Each block has a number of non-interfering holes disposed at right angles to each other. Each electrode is fastened to one or more blocks with screws or bolts and the blocks are fastened to the backing plate using screws which engage holes tapped in the backing plate. It will be appreciated from FIG. 3 that in using brass rule electrodes, the corners of the rectangular edge weld will be sharp right angles since the rule electrodes meet at right angles. Moreover, unless the corner connections of the rule electrodes are beveled, the resulting weld will be uneven. It is usually desirable, however, to provide a weld with rounded corners so that the corners of the edge weld will be smooth, attractive, and more resistant to separating.

Prior art FIG. 3a shows one of the presently preferred methods of providing rounded corner edge welds. Four rule electrodes 39, 41, 43, 45 are each provided with a curved right angle bend 39a, 41a, 43a, 45a by working the brass electrodes around a curved bending tool. The electrodes are then mounted to the backing plate as described above. While this method provides rounded corners, it leaves seams s1, s2, s3, s4 between each electrode along their straight edges. Another method of providing rounded corners in a rectangular edge weld electrode is to take two single rule electrodes, bend each two times and swage/the ends. Both methods require the use of a machine shop and involve considerable time and effort.

SUMMARY OF THE INVENTION

It is therefore an object of the invention to eliminate the need for bending rule electrodes to provide rounded corners in an edge welding electrode and for forming multiple cavity electrodes.

It is also an object of the invention to eliminate the need for beveling the ends of rule electrodes to produce a smooth corner connection.

It is another object of the invention to provide an apparatus for joining two or more rule electrodes which automatically and accurately aligns the electrodes.

It is still another object of the invention to provide an apparatus for joining two or more rule electrodes which can be used with a conventional backing plate.

In accord with these objects which will be discussed in detail below, the slot interlock connectors of the present invention include an electrode having a working edge, at least two end edges and an integral mounting block which has ends which overshadow the end edges of the electrode and provide substantially flat alignment surfaces adjacent to the end edges of the electrode. In a first embodiment of the invention, the electrode has a curved working edge and the integral mounting block is disposed on the interior concave surface of the curved electrode. In a second embodiment of the invention, the electrode has two curved working edges with two integral mounting blocks disposed on inner concave surfaces of the curves. The electrode has three end edges aligned relative to each other in a T formation. As in the first embodiment, the ends of the mounting blocks overshadow the end edges of the electrode. The mounting blocks provide substantially flat alignment surfaces adjacent to two end edges of the electrode and an alignment channel (or slot) surrounding the third end edge of the electrode. In a third embodiment of the invention, the electrode has four curved working edges and four end edges aligned in a + formation. Four integral mounting blocks are disposed adjacent the concave surfaces of the curves and form four alignment channels surrounding the respective four end edges of the electrode. In other embodiments of the invention, the working edges are not curved but are provided with the integral mounting block(s) and self-alignment surfaces. Depending on the type of product being manufactured, the electrode may have any number of working edges which are aligned in any number of ways provided that each end edge is provided with at least one alignment surface.

Preferred aspects of the invention include machining the electrode connectors from brass, providing the working edge(s) of the electrode with tearseal or other decorative profile if desired, and providing the integral mounting blocks with pre-drilled mounting holes. Additional objects and advantages of the invention will become apparent to those skilled in the art upon reference to the detailed description taken in conjunction with the provided figures.

BRIEF DESCRIPTION OF THE DRAWINGS

FIG. 6a is a top view of the embodiment of FIG. 6;

DETAILED DESCRIPTION OF THE PREFERRED EMBODIMENTS

Figure 1:
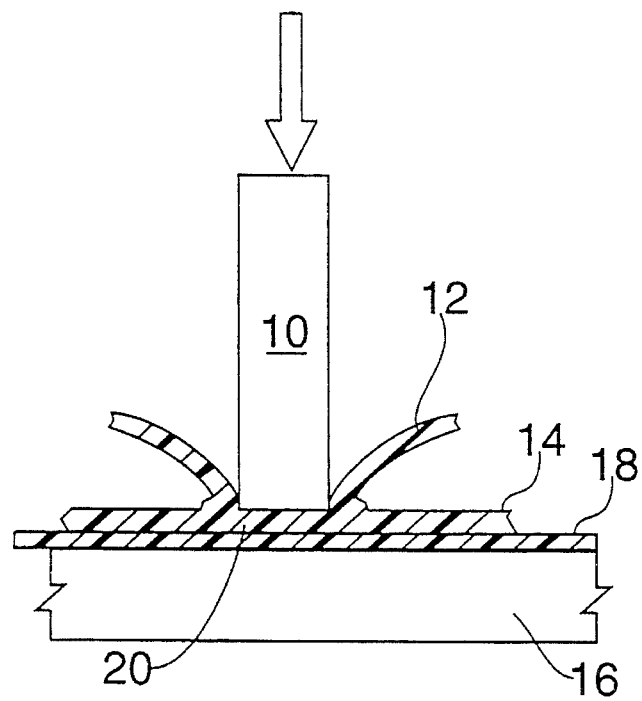
FIG. 1 is a broken cross sectional view of a prior art RF sealing bar electrode sealing two sheets of PVC film.
Figure 2:
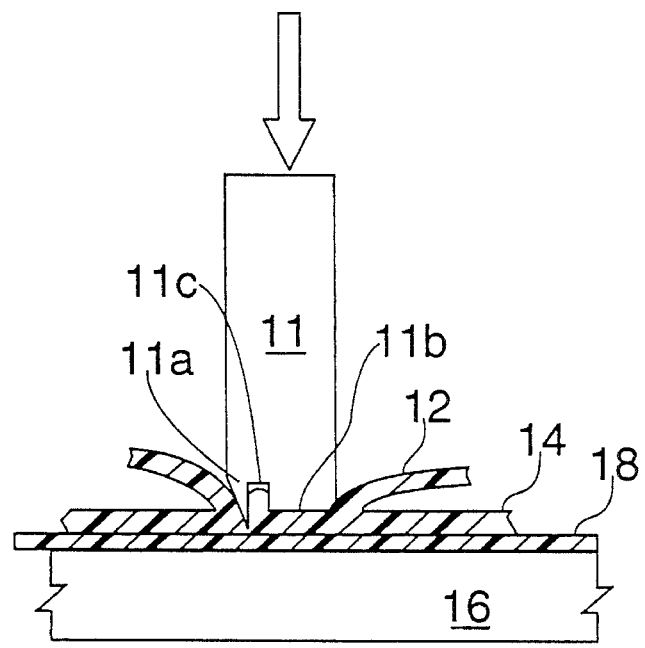
FIG. 2 is a broken cross sectional view of a prior art RF tear-sealing bar electrode sealing two sheets of PVC film.
Figure 3:
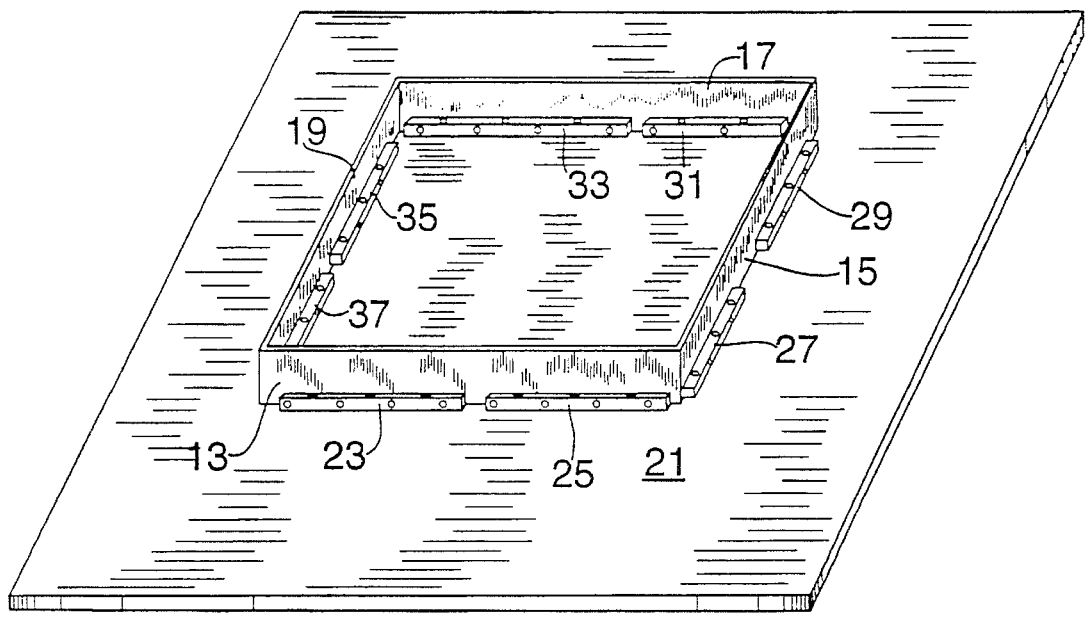
FIG. 3 is a perspective view of a prior art backing plate with four welding electrodes mounted thereon.
Figure 3A:
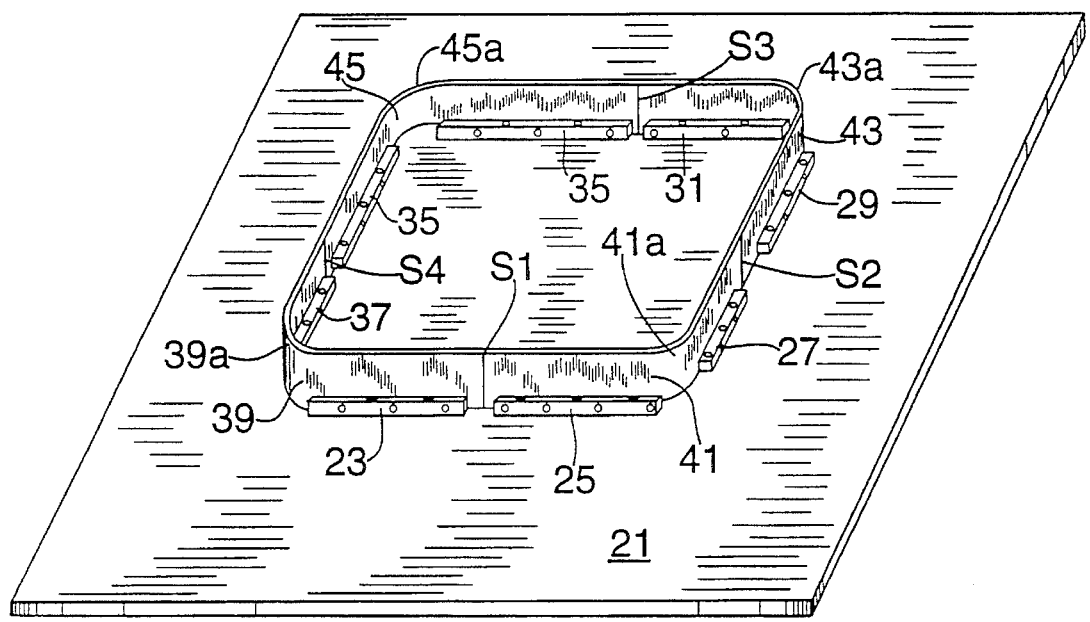
FIG. 3a is a view similar to FIG. 3 of a prior art arrangement for providing rounded corners in a rectangular edge welding electrode.
Figure 4:
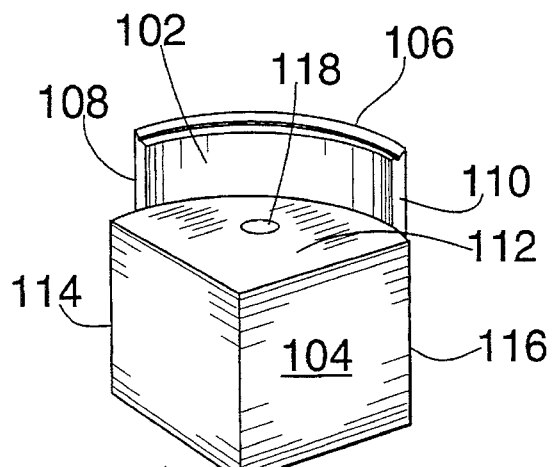
FIG. 4 is a perspective view of a first embodiment of the invention.
Figure 4A:
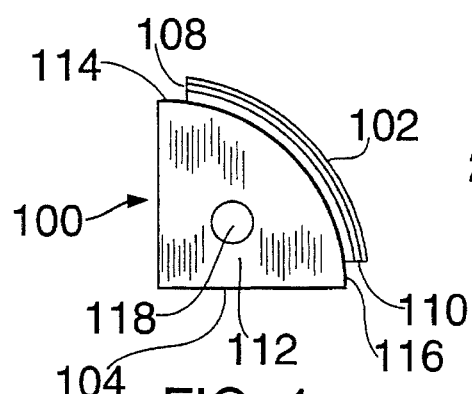
FIG. 4a is a top view of the embodiment of FIG. 4.
Figure 4B:
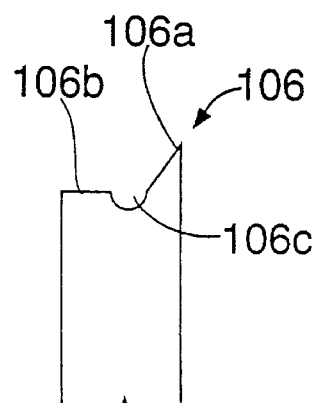
FIG. 4b is an enlarged broken sectional view of the working edge of the embodiment of FIG. 4.
Figure 4C:
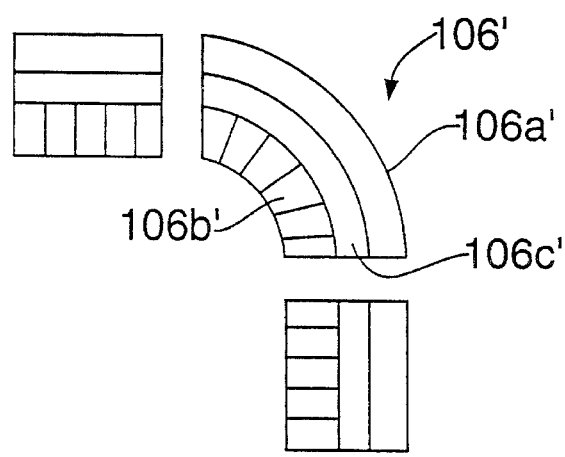
FIG. 4c is an enlarged broken top view of an alternate working edge of the embodiment of FIG. 4.

Referring now to FIGS. 4, 4a, and 4b, a first embodiment of a connector 100 according to the invention is a single integral machined brass piece. The connector 100 has an electrode portion 102 and a mounting block portion 104. The electrode 102 has an upper working edge 106 and two end edges 108, 110 which are substantially orthogonal to the working edge 106. The two end edges 108, 110 are disposed at ninety degrees to one another in an L-type formation. The working edge 106 is preferably curved and provided with a tearseal profile as shown in FIG. 4b with an outer sharp edge 106a, an inner sealing surface 106b, and an intermediate bead well 106c. The integral mounting block portion 104 has an upper surface 112 which is lower than the upper working edge 106 of the electrode portion 102 and two end surfaces 114, 116 which each overshadow respective end edges 108, 110 of the electrode portion 102 to provide self-alignment surfaces as described more fully below. The mounting block portion 104 is also provided with a mounting hole 118 for attaching the connector 100 to a backing plate and is useful in making a right angle connection between two rule electrodes as described in detail below. As shown in FIGS. 4 and 4a, the integral mounting block portion 104 of the connector 100 is disposed on the interior concave portion of the electrode portion 102. It will be appreciated that the mounting block portion of the electrode may be arranged on the convex portion of the working edge rather than on the concave portion as shown. Moreover, as shown in FIG. 4c, the working edge 106' may have a decorative pattern in the sealing surface 106b'. Indeed, those skilled in the art will appreciate that the profile of the working edge need not be a tearseal profile at all and may be configured in any known way.

Figure 5:
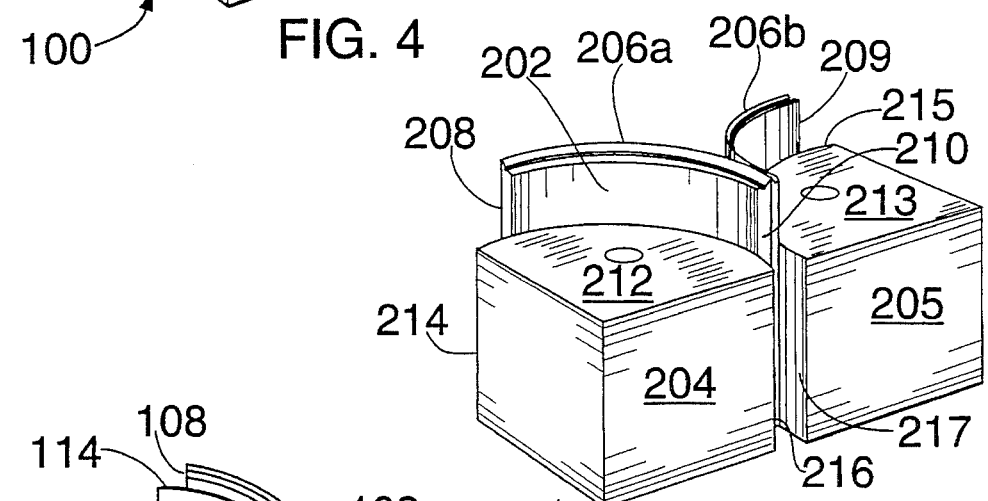
FIG. 5 is a perspective view of a second embodiment of the invention.
Figure 5A:
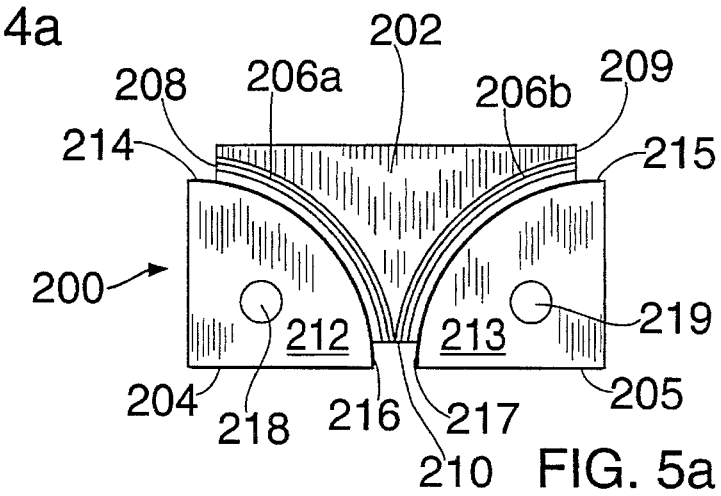
FIG. 5a is a top view of the embodiment of FIG. 5.

FIGS. 5 and 5a show a second embodiment of a connector 200 according to the invention. The connector 200 has an electrode portion 202 and two integral mounting block portions 204, 205. The electrode 202 has two upper working edges 206a, 206b and three end edges 208, 209, 210 which are substantially orthogonal to the working edges 206a, 206b. The two working edges 206a, 206b diverge from a common end edge 210 and the three end edges 208, 209, 210 are disposed in an T-type formation- The working edges 206a, 206b are preferably curved and provided with a tearseal profile, although any desired profile can be provided as discussed above with reference to FIG. 4c. The integral mounting block portions 204, 205 have respective upper surfaces 212, 213 which are lower than respective upper working edges 206a, 206b of the electrode portion 202. Mounting block portion 204 has two end surfaces 214, 216 which each overshadow respective end edges 208, 210 of the electrode portion 202 and mounting block portion 205 has two end surfaces 215, 217 which each overshadow respective end edges 209, 210 of the electrode portion 202. The surfaces 214, 215 of the mounting block portions provide self-alignment surfaces and the surfaces 216, 217 provide a self-alignment channel as described more fully below. The mounting block portions 204, 205 are also provided with respective mounting holes 218, 219 for attaching the connector 200 to a backing plate as described in detail below.

Figure 6:
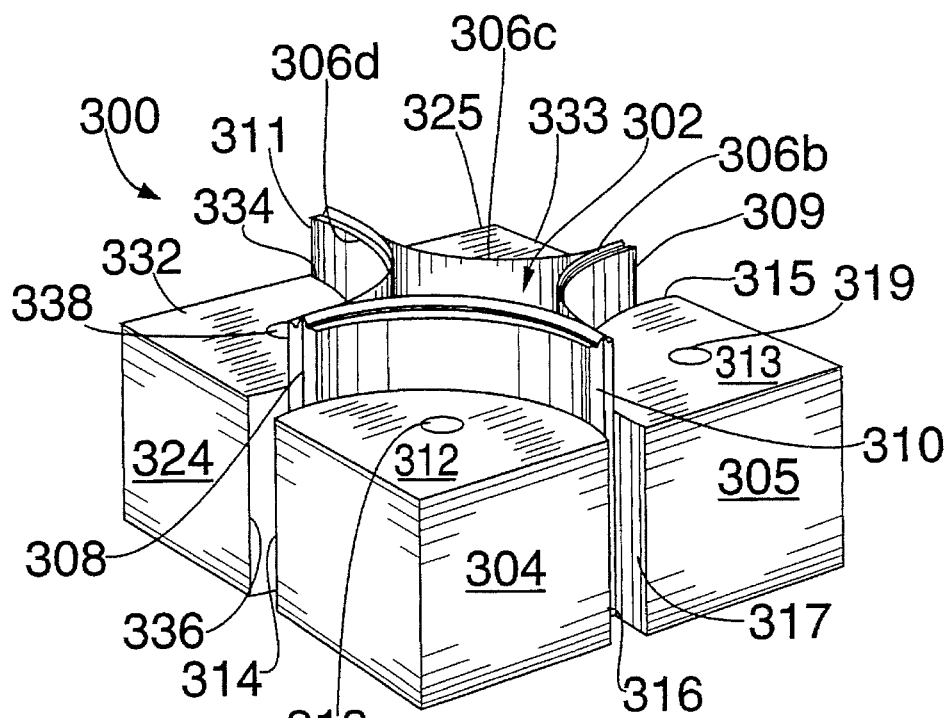
FIG. 6 is a perspective view of a third embodiment of the invention.
Figure 5B:
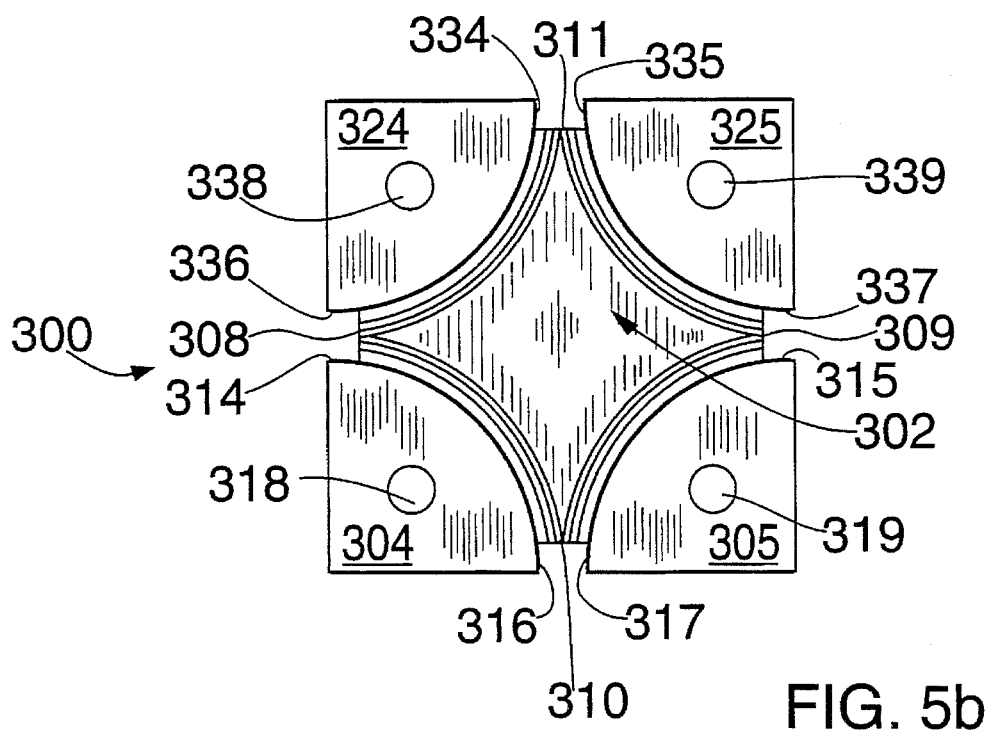

A third embodiment of a connector 300 is shown in FIGS. 6 and 6a. The connector 300 has an electrode portion 302 and four integral mounting block portions 304, 305, 324, 325. The electrode 302 has four upper working edges 306a–d and four end edges 308, 309, 310, 311 which are substantially orthogonal to the working edges 306a–d. Each working edge shares a common end edge with two other working edges. E.g., working edge 306a shares end edge 308 with working edge 306d and end edge 310 with working edge 306b. The three end edges 308, 309, 310, 311 are disposed in a + type formation. The working edges 306a–d are preferably curved and provided with a tearseal profile, although any desired profile can be provided. The integral mounting block portions 304, 305, 324, 325 have respective upper surfaces 312, 313, 332, 333 which are lower than respective upper working edges 306a–d of the electrode portion 302. Mounting block portion 304 has two end surfaces 314, 316 which each overshadow respective end edges 308, 310 of the electrode portion 302. Mounting block portion 305 has two end surfaces 315, 317 which each overshadow respective end edges 309, 310 of the electrode portion 302. Mounting block portion 324 has two end surfaces 334, 336 which each overshadow respective end edges 311, 308 of the electrode portion 302. Mounting block portion 325 has two end surfaces 335, 337 which each overshadow respective end edges 311, 309 of the electrode portion 302. The surfaces 314 and 336 of the mounting block portions provide a self-alignment channel around end edge 308. The surfaces 315 and 337 of the mounting block portions provide a self-alignment channel around end edge 309. The surfaces 316 and 317 of the mounting block portions provide a self-alignment channel around end edge 310. The surfaces 335 and 334 of the mounting block portions provide a self-alignment channel around end edge 311. The mounting block portions 304, 305, 324, 325 are also provided with respective mounting holes 318, 319, 338, 339 for attaching the connector 300 to a backing plate as described in detail below.

Figure 7:
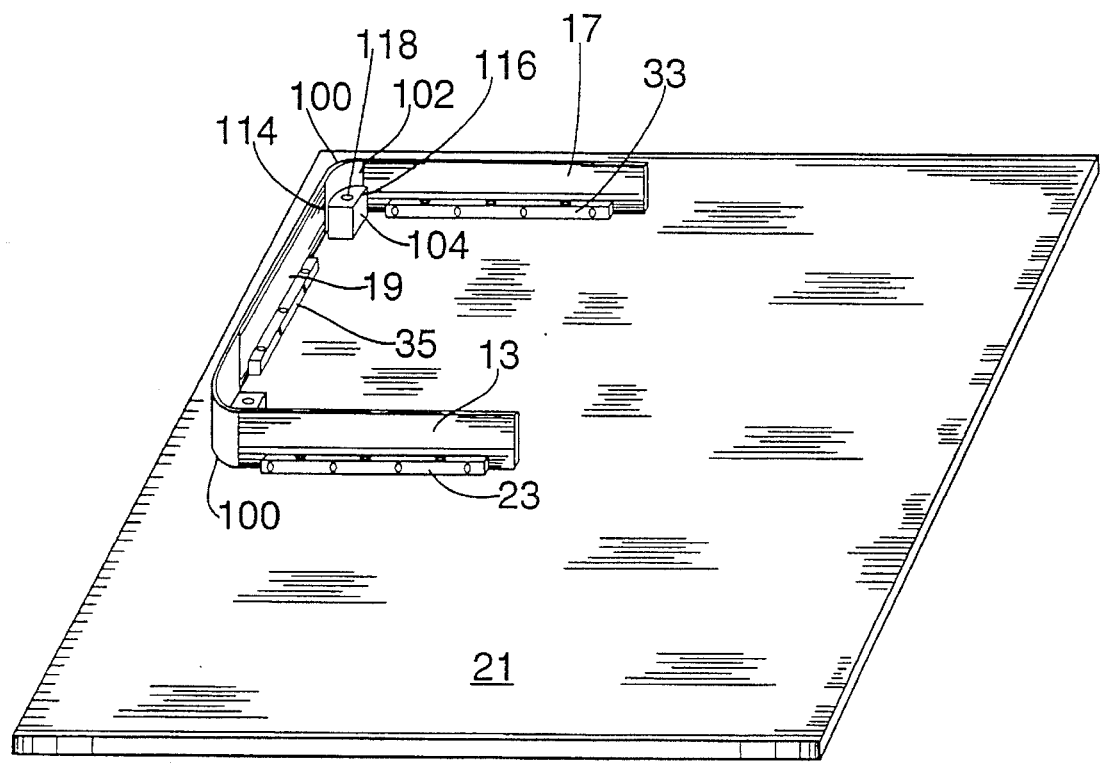
FIG. 7 is a perspective view of a partially assembled electrode using the first embodiment of the invention.
Figure 8:
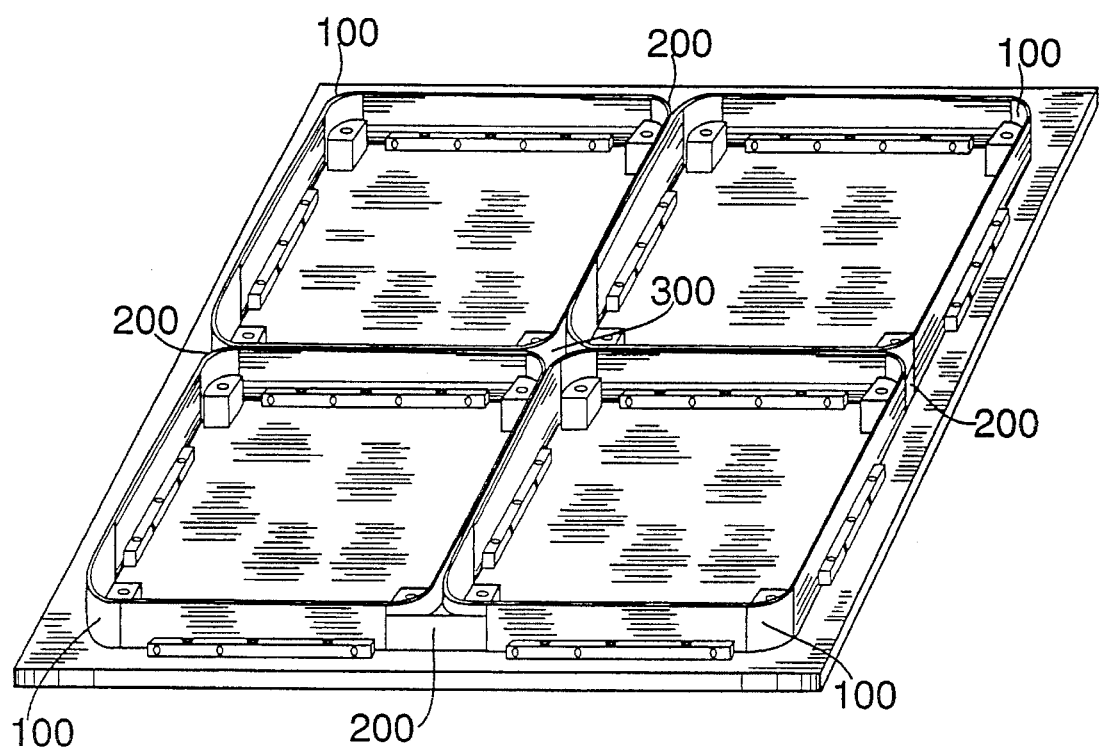
FIG. 8 is a perspective view illustrating an electrode using the first, second and third embodiments of the invention.

Turning now to FIG. 7, two connectors 100 according to the invention are shown connecting three rule electrodes 13, 17, 19 on a backing plate 21. From the description above, and with reference to FIG. 7, those skilled in the art will appreciate that the surfaces 114, 116 on the integral mounting block portion 104 provide for a smooth self-alignment of the respective ends of electrodes 17, 19 with the integral electrode portion 102 of the connector 100. The connector 100 is mounted to the backing plate 21 in a conventional manner using the mounting hole 118. The rule electrodes 17, 19 are aligned with the connector 100 by placing their ends against the aligning surfaces 114, 116 and are connected to the backing plate 21 in a conventional manner. It will be further appreciated that, by using different embodiments of the connectors 100, 200, 300 as shown in FIG. 8, many different types of electrode layouts may be created quickly and easily without any bending or machining. The example shown in FIG. 8 is a typical "Four-Up" welding electrode arrangement which is created from four 100 connectors, four 200 connectors, and one 300 connector and twelve conventional rule electrodes.

Figure 9:
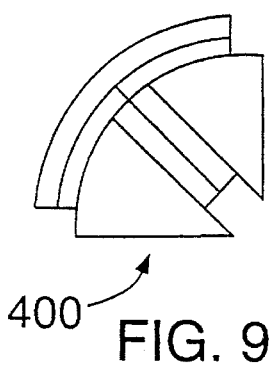
FIG. 9 is an enlarged top view of a fourth embodiment of the invention.
Figure 10:
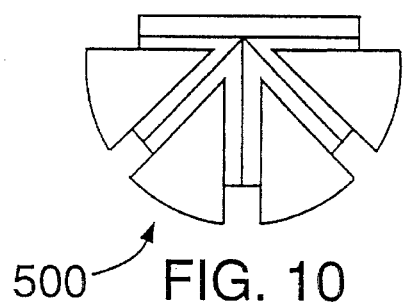
FIG. 10 is an enlarged top view of a fifth embodiment of the invention.
Figure 11:
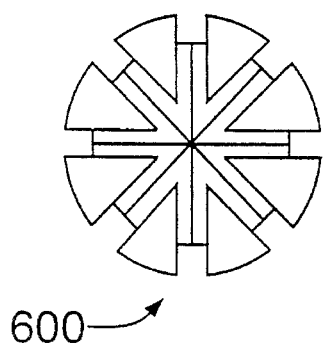
FIG. 11 is an enlarged top view of a sixth embodiment of the invention.
Figure 12:
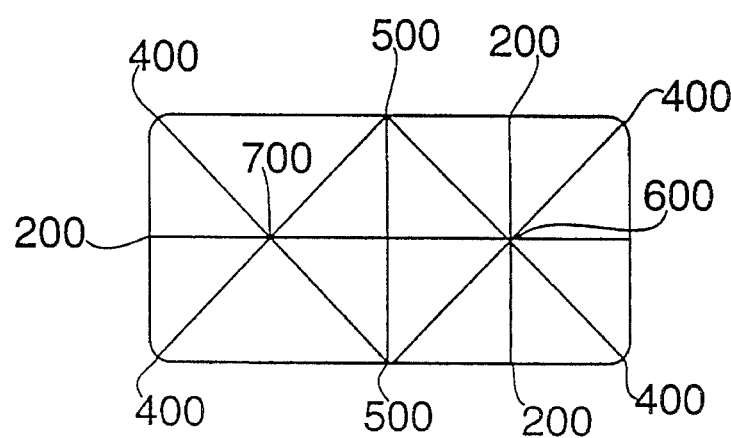
FIG. 12 is a schematic top view of an assembled multiple cavity electrode using several of the embodiments of the invention.

Turning now to FIGS. 9 through 11, and from the foregoing, those skilled in the art will appreciate that many different configurations of the invention are possible, each incorporating the inventive alignment surface(s). As seen in FIGS. 9 through 11, a corner electrode connector 400 has a curved working edge and a radial working edge and will couple three rule electrodes as shown in FIG. 12. Connector 500 has four straight working edges which converge at a common point and will couple five rule electrodes as shown in FIG. 12. Connector 600 has four straight working edges which intersect and will couple eight rule electrodes as shown in FIG. 12. While not explicitly described, the schematically illustrated connector 700 shown in FIG. 12 will be understood by those skilled in the art in view of the foregoing description of the other embodiments of the invention.

There have been described and illustrated herein several embodiments of slot interlock connectors for connecting high frequency welding electrodes. While particular embodiments of the invention have been described, it is not intended that the invention be limited thereto, as it is intended that the invention be as broad in scope as the art will allow and that the specification be read likewise. Thus, while particular working edge configurations have been disclosed, it will be appreciated that other working edge configurations could be utilized. Also, while curved electrode portions have been shown, it will be recognized that other configurations of the electrode portions could be used with similar results obtained. For example, the electrode portions of the connectors might be linear, curved in more than one direction, or a combination of linear and curved. In addition, as described above, the working edge(s) of the electrode connectors may have any of a number of profiles other than tearseal, e.g., flat, patterned for embossing, etc. Moreover, while particular configurations have been disclosed in reference to the location of the mounting block portion relative to the electrode portion, it will be appreciated that other configurations could be used as well so long as the mounting block portion overshadows the end edges of the electrode portion. Furthermore, while the mounting block portions have been disclosed as each having a single mounting hole, it will be understood that additional mounting holes may be provided depending on the dimensions of the connectors. In addition, while the invention has been disclosed as preferably machined from brass, it will be understood that other materials such as copper, aluminum, or bronze. Also, while machining is the preferred method of manufacture, casting may be used or a combination of casting and finishing by machining may be used to fabricate the invention. It will therefore be appreciated by those skilled in the art that yet other modifications could be made to the provided invention without deviating from its spirit and scope as so claimed.

We claim:

1. A connector for connecting a first high frequency welding electrode to a second high frequency welding electrode on a backing plate, said connector comprising:

a connector electrode having a first upper working edge and first and second end edges which are substantially orthogonal to said first upper working edge; and a first integral mounting block for mounting said connector on the backing plate, said first integral mounting block having a first upper surface which is lower than said first upper working edge and first and second end surfaces, each of said first and second end surfaces overshadowing a respective end edge of said connector electrode and providing a substantially flat alignment surface adjacent to said respective end edge of said connector electrode, whereby, an end of the first high frequency welding electrode is aligned with said first end edge of said connector electrode by said first end surface of said first integral mounting block and an end of the second high frequency welding electrode is aligned with said second end edge of said connector electrode by said second end surface of said first integral mounting block.

2. A connector according to claim 1, wherein:

said first and second end edges and said first and second end surfaces are arranged so that said connector makes an angled connection between the first and second high frequency welding electrodes.

3. A connector according to claim 2, wherein:

said first upper working edge is curved.

4. A connector according to claim 3, wherein:

said connector is machined brass.

5. A connector according to claim 3, wherein:

said integral mounting block includes a mounting hole for mounting said connector on the backing plate.

6. A connector according to claim 3, wherein:

said first upper working edge has one of a tearseal profile, a welding profile, and a decorative embossing profile.

7. A connector according to claim 1 for connecting a first, second, and third high frequency welding electrode on a backing plate, said connector further comprising:

a second integral mounting block for mounting said connector on the backing plate;

said connector electrode having a second upper working edge and a third end edge which is substantially orthogonal to said second upper working edge;

said second integral mounting block having a second upper surface which is lower than said second upper working edge and third and fourth end surfaces, said third end surface overshadowing said third end edge of said connector electrode and providing a substantially flat alignment surface adjacent to said third end edge of said connector electrode, said fourth end surface overshadowing said first end edge and providing with said first end surface an alignment channel around said first end edge, wherein, an end of the third high frequency welding electrode is aligned with said third end edge of said connector electrode by said third end surface of said second integral mounting block and the end of the first high frequency welding electrode is aligned with said first end edge of said connector electrode by said first and fourth end surfaces of said integral mounting blocks.

8. A connector according to claim 7, wherein:

said first and second end edges and said first and second end surfaces are arranged so that said connector makes a substantially right angle connection between the first and second high frequency welding electrodes, and said first and third end edges and said first and third end surfaces are arranged so that said connector makes a substantially right angle connection between the first and third high frequency welding electrodes.

9. A connector according to claim 8, wherein:

said first and second upper working edges are curved.

10. A connector according to claim 9, wherein:

said first and second upper working edges are connected at and share said first end edge.

11. A connector according to claim 9, wherein:

said first and second integral mounting blocks each include a mounting hole for mounting said connector on the backing plate.

12. A connector according to claim 9, wherein:

said first and second upper working edges have one of a tearseal profile, a welding profile, and a decorative embossing profile.

13. A connector according to claim 7 for connecting a first, second, third, and fourth high frequency welding electrode on a backing plate, said connector further comprising:

a third integral mounting block for mounting said connector on the backing plate; and a fourth integral mounting block for mounting said connector on the backing plate;

said connector electrode having a third upper working edge and a fourth upper working edge, said third and fourth upper working edges sharing a common fourth end edge which is substantially orthogonal to said third and fourth upper working edge, said second and third upper working edges sharing said third end edge, said first and fourth upper working edges sharing said second end edge;

said third and fourth integral mounting blocks having respective third and fourth upper surfaces which are lower than respective third and fourth upper working edges, said third integral mounting block having fifth and sixth end surfaces, said fourth integral mounting block having seventh and eighth end surfaces, said fifth end surface overshadowing said third end edge of said connector electrode and providing with said third end surface an alignment channel around said third end edge of said connector electrode, said sixth and seventh end surfaces overshadowing said fourth end edge of said connector electrode and providing an alignment channel around said fourth end edge of said connector electrode, said eighth end surface overshadowing said second end edge and providing with said second end surface an alignment channel around said second end edge, wherein the end of the third high frequency welding electrode is aligned with said third end edge of said connector electrode by said third end surface and said fifth end surface, an end of the fourth high frequency welding electrode is aligned with said fourth end edge by said sixth end surface and said seventh end surface and the end of the second high frequency welding electrode is aligned with said second end edge of said connector electrode by said second and eighth end surfaces.

14. A connector according to claim 13, wherein:

said end edges and said end surfaces are arranged so that a substantially right angle connection is made between the first and second high frequency welding electrodes, a substantially right angle connection is made between the first and third high frequency welding electrodes, and a substantially right angle connection is made between the third and fourth high frequency welding electrodes.

15. A connector according to claim 14, wherein:

said first, second, third, and fourth upper working edges are curved.

16. A connector according to claim 15, wherein:

said first and second upper working edges are connected at and share said first end edge, said second and third upper working edges are connected at and share said third end edge, said third and fourth upper working edges are connected at and share said fourth end edge, and said first and fourth upper working edges are connected at and share said second end edge.

17. A connector according to claim 15, wherein:

said first, second, third, and fourth integral mounting blocks each include a mounting hole for mounting said connector on the backing plate.

18. A connector according to claim 15, wherein:

said first, second, third and fourth upper working edges each have one of a tearseal profile, a welding profile, and a decorative embossing profile.

19. A method of making a high frequency welding electrode assembly from a first high frequency welding electrode, a second high frequency welding electrode, and a backing plate, said method comprising:

providing a connector electrode having a first upper working edge and first and second end edges which are substantially orthogonal to said first upper working edge, and a first integral mounting block for mounting said connector on the backing plate, said first integral mounting block having a first upper surface which is lower than said first upper working edge and first and second end surfaces, each of said first and second end surfaces overshadowing a respective end edge of said connector electrode and providing a substantially flat alignment surface adjacent to said respective end edge of said connector electrode;

attaching said first integral mounting block to the backing plate;

aligning an end of the first high frequency welding electrode with said first end edge of said connector electrode using said first end surface of said first integral mounting block; and aligning an end of the second high frequency welding electrode with said second end edge of said connector electrode using said second end surface of said first integral mounting block.

* * * * *